United States Patent
Barazany et al.

(10) Patent No.: US 9,729,822 B2
(45) Date of Patent: Aug. 8, 2017

(54) METHOD AND SYSTEM FOR SHARING CONTENT IN VIDEOCONFERENCING

(71) Applicant: Polycom, Inc., San Jose, CA (US)

(72) Inventors: Avihay Barazany, Kiryat Ono (IL); Eyal Leviav, Tel Aviv (IL)

(73) Assignee: Polycom, Inc., San Jose, CA (US)

( * ) Notice: Subject to any disclaimer, the term of this patent is extended or adjusted under 35 U.S.C. 154(b) by 522 days.

(21) Appl. No.: 14/283,691

(22) Filed: May 21, 2014

(65) Prior Publication Data

US 2014/0347435 A1  Nov. 27, 2014

Related U.S. Application Data

(60) Provisional application No. 61/827,112, filed on May 24, 2013.

(51) Int. Cl.
  G06F 3/0481 (2013.01)
  H04N 7/15 (2006.01)

(52) U.S. Cl.
  CPC ..................... *H04N 7/15* (2013.01)

(58) Field of Classification Search
  CPC .......... G06F 3/00; G06F 3/048; G06F 3/0481; G06F 3/0482; G06F 3/0484; G06F 3/04842; G06F 15/00; G06F 15/16; G06F 17/00; G06F 17/211; G06F 17/241; G06Q 10/10; H04N 5/74; H04N 7/14; H04N 7/15; H04L 29/00
  See application file for complete search history.

(56) References Cited

U.S. PATENT DOCUMENTS

| | | | |
|---|---|---|---|
| 5,867,654 A * | 2/1999 | Ludwig | G06Q 10/10 348/E7.081 |
| 7,542,068 B2 | 6/2009 | Eshkoli et al. | |
| 7,877,460 B1 * | 1/2011 | Brouwer | G06Q 10/10 709/205 |
| 8,228,363 B2 | 7/2012 | Halavy | |
| 2004/0230655 A1 * | 11/2004 | Li | G06F 17/30056 709/205 |
| 2006/0066717 A1 * | 3/2006 | Miceli | H04N 7/147 348/14.09 |
| 2007/0188596 A1 * | 8/2007 | Kenoyer | H04L 29/06027 348/14.08 |
| 2010/0030578 A1 * | 2/2010 | Siddique | G06Q 10/0637 705/3 |
| 2011/0090302 A1 * | 4/2011 | Leviav | H04N 7/152 348/14.09 |
| 2012/0317483 A1 * | 12/2012 | Shapiro | G06Q 10/101 715/716 |

* cited by examiner

Primary Examiner — Xiomar L Bautista
(74) Attorney, Agent, or Firm — Blank Rome, LLP

(57) ABSTRACT

Content presented in association with a transmitting endpoint is obtained by the transmitting endpoint and transmitted to a receiving endpoint of a videoconference, along with associated information regarding interaction of a presenter with the content at the transmitting side. The receiving endpoint presents the presented content obtained from the transmitting endpoint similar to the presentation format at the transmitting side. Where the original presentation format is not suitable for transmission, a video image of the content in the original presentation format may be transmitted. An intermediate control unit, such as a multipoint control unit, may relay content and associated information between transmitting and receiving endpoints.

33 Claims, 7 Drawing Sheets

METHOD AND SYSTEM FOR SHARING CONTENT IN VIDEOCONFERENCING

CROSS-REFERENCE TO RELATED APPLICATIONS

This application claims the benefit of the prior filing date of the U.S. provisional application for patent that was filed on May 24, 2013 bearing the title of "METHOD AND SYSTEM FOR SHARING CONTENT IN VIDEOCONFERENCING," and assigned Ser. No. 61/827,112.

TECHNICAL FIELD

The present invention relates to video communication and more particularly to the field of presenting content in videoconferencing.

BACKGROUND ART

As traffic over Internet Protocol (IP) networks and other type of networks continues its rapid growth, and with the growth of the variety of multimedia conferencing equipment, more and more people use multimedia conferencing as their communication tool. A plurality of videoconferencing types of session require content to be presented with the video image. Business meetings, educational sessions, lectures, marketing presentations, professional meetings (such as design reviews), etc. require content presentation. Different types of content such as EXCEL® tables, POWERPOINT® presentations, slides, charts, drawings, etc. may be presented during a video conferencing session. EXCEL and POWERPOINT are registered trademarks of Microsoft Corporation.

Usually the content is important for understanding the current discussion; therefore, the content is delivered to all the conferees. Today, at a delivery endpoint, content is converted to video stream by capturing, few times per second, the image of the screen of the computer that runs the presentation. Then the video stream of the presentation may be compressed by an encoder in addition to the encoder that is used for handling the video stream of the conference. In most cases, the frame rate used by the encoder to compress the content is low, 1 to 10 frames per second for example. The compressed content may be sent from the delivery endpoint toward a multipoint control unit (MCU) over a separate stream using a different channel than the endpoint video image. From the MCU the content may be sent toward one or more receiving endpoints as video switching over a separate stream other than the continuous presence video image of the conference. The parameters of the content encoder are negotiated to the highest common parameters. In some video conferences, the MCU may transcode the content that is sent toward one or more receiving endpoints. Further, for some limited endpoints that cannot handle the content as a separate video stream, the MCU may treat the content as a video stream from an endpoint, and may add it to a segment in the continuous presence video image that is targeted toward the limited receiving endpoints.

An MCU is a conference controlling entity that is typically located in a node of a network or in a terminal that receives several channels from endpoints. According to certain criteria, the MCU processes audio and visual signals and distributes them to a set of connected channels. Examples of MCUs include the MGC-100™, RMX 2000®, which are available from Polycom, Inc. (MGC-100 is a trademark of Polycom, Inc. RMX-2000 is a registered trademark of Polycom, Inc.) A terminal, which may be referred to as an endpoint, is an entity on the network, capable of providing real-time, two-way audio and/or video and/or content visual communication with another endpoint or with an MCU. A more thorough definition of an endpoint and an MCU may be found in the International Telecommunication Union ("ITU") standards, such as but not limited to the H.120, H.324, and H.323 standards, which may be found at the ITU website: www.itu.int.

SUMMARY OF INVENTION

Content presented at a transmitting endpoint is obtained by the transmitting endpoint and transmitted to a receiving endpoint of a videoconference, along with associated information regarding interaction of a presenter with the content at the transmitting endpoint. The receiving endpoint presents the presented content obtained from the transmitting endpoint similar to the presentation format at the transmitting endpoint. Where the original presentation format is not suitable for transmission, a video image of the content in the original presentation format may be transmitted. An intermediate control unit, such as a multipoint control unit, may relay content and associated information between transmitting and receiving endpoints.

These and other aspects of the description will be apparent in view of the attached figures and detailed description. The foregoing summary is not intended to summarize each potential embodiment or every aspect of the present description, and other features and advantages of the present description will become apparent upon reading the following detailed description of the embodiments with the accompanying drawings and appended claims.

Furthermore, although specific embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings, FIG. 1 schematically illustrates a simplified block diagram with relevant elements of a videoconferencing system according to one embodiment.

DESCRIPTION OF EMBODIMENTS

Figure 1:
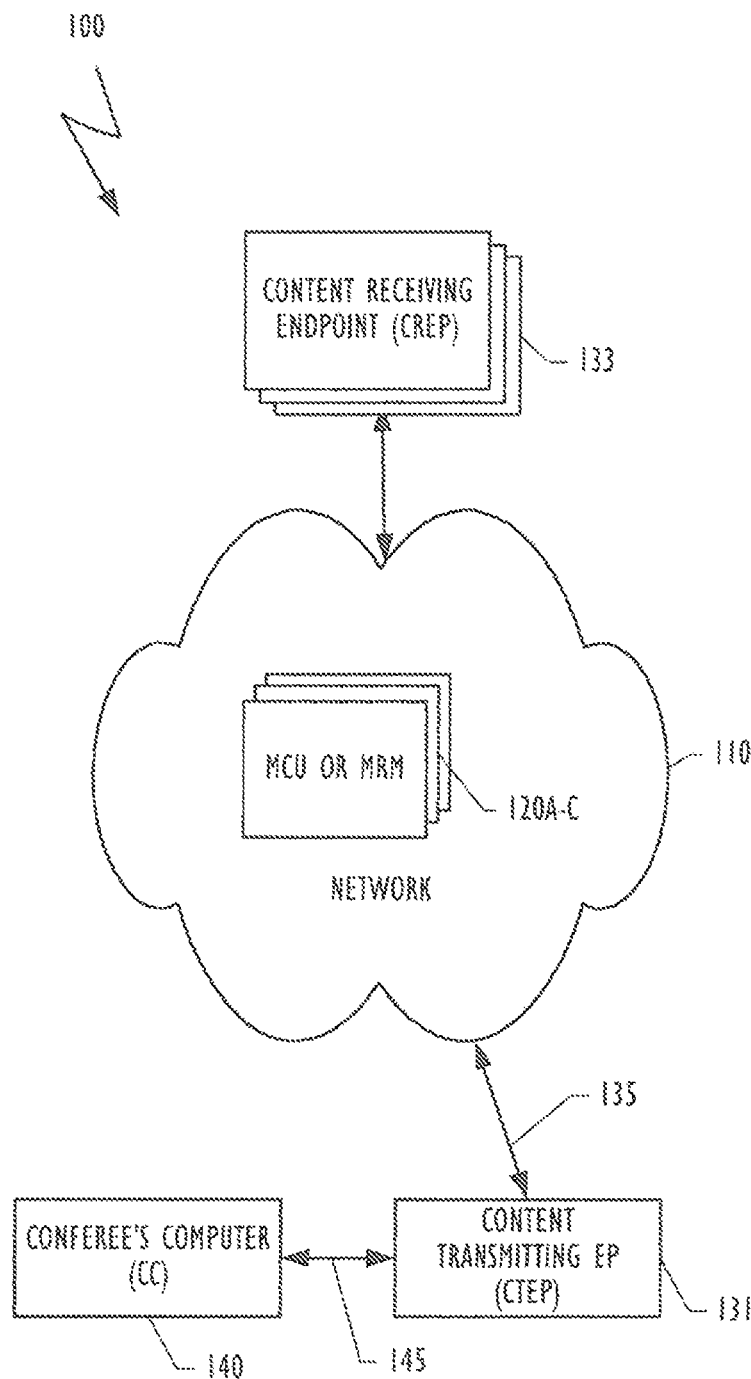

Turning now to the figures, in which like numerals represent like elements throughout the several views, embodiments of the present description are described. For convenience, only some elements of the same group may be labeled with numerals. The purpose of the drawings is to describe embodiments and not for production. Therefore, features shown in the figures are chosen for convenience and clarity of presentation only. Moreover, the language used in this description has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied as instructions stored on a computer readable medium such as a read/write hard disc, CDROM, Flash memory, ROM, or other memory or storage, etc. In order to execute a certain task, a software program may be loaded to an appropriate processor as needed. In the present description the terms task, method, process may be used interchangeably.

Converting content from its origin format into compressed video and associating it with the video of the conference reduces the quality of the presented content. Video compression uses lossy compression algorithms, therefore each encoding/decoding cycle along the path from the content transmitting endpoint (CTEP) toward a plurality of content receiving endpoints (CREPs), directly or via one or more MCUs, reduces the quality of the presented content. Further, the resolution of the presented content is the resolution of the video image (CIF, SD, HD 720, HD 1080, for example), which is lower than the resolution of content that may be presented by using the original file format, which utilizes the resolution of the screen, for example. The resolution for CIF is 352×288; the resolution for Standard Definition (SD) is 704×576; the resolution for high definition (HD) 720 is 1280×720; the resolution for HD 1080 is 1920×1080. Furthermore, associating the content as compressed video with the compressed video image reduces the bit rate that may be allocated for carrying the compressed video image, thus reduces the quality of the video images.

The above-described deficiencies of handling content in videoconferencing are not intended to limit the scope of the inventive concepts of the present disclosure in any manner. The disclosure is directed to a novel technique for handling content in videoconferencing. The new technique may handle the content by its original application. Other embodiments of the present disclosure converts the content from its original file format into a popular presentation file format such as PDF, slide deck, spreadsheet, etc. and handling the content by the popular presentation application. In the following description, the claims, and the drawings the term "original application," "original format," and "original file format" may be used interchangeably.

An example embodiment of a videoconferencing system capable of sending original application content may comprise a CTEP and a CREP. The CTEP may be associated with a conferee's computer that is used as the source of the presented content. The conferee's computer (CC) may be a personal computer, a laptop, a notebook, tablet, a smart phone, or any other computing device with data communication capabilities. In some embodiment the conferee's computer and the CTEP may be included in the same device. In some embodiments of the system, the content may be delivered from a CTEP to a plurality of CREPs via an intermediate node. The intermediate node may be an MCU or a media relay MCU (MRM).

An MRM is another conference controlling entity that may be located in a node of a network, in a terminal, or elsewhere. The MRM may receive several media channels from access ports and according to certain criteria may relay them to connected channels via other ports. A reader who wishes to learn more about an MRM is invited to read U.S. Pat. No. 8,228,363, which is incorporated herein by reference in its entirety for all purposes. In alternate embodiments a SIP server, which is capable of establishing real time video conferencing session between two terminals, may be used as an intermediate node.

An example of a CTEP may be configured to comprise a content transmitting module (CTM). An example of CTM may be capable to communicate with an associated conferee's computer over an IP connection or a local area network (LAN), for example. When a conferee wants to share a content file with the other conferees that participate in the videoconferencing session, the conferee, by using the CC, may set a connection with the CTM at the associated endpoint. The connection may be an IP connection over the Internet or an Intranet. In other embodiments, the CC and the CTEP may be connected over a LAN and the connection may be based on the communication protocol used over the LAN, Ethernet protocol for example.

Upon establishing the connection between the CC and the CTEP, a content transmitting client agent (CTCA) may be loaded to the CC. The CTCA may be loaded from the CC memory device (a disc for example). In other embodiments, the CTCA may be downloaded from the CTEP to the CC. The CTCA may instruct the conferee to select the requested content file and to open it by using similar application to the one that was used to create the file. An original application may be a spreadsheet reader, such an Excel for example, presentation reader such as PowerPoint for example, Portable Document Format (PDF) reader application, etc. When the content file was selected, the CTCA may be adapted to fetch the file from the CC memory device and send it toward the CTEP. Sending the content file may be offline via an email, for example. Alternatively, the content file may be sent online over a connection that was established between the CC and the CTEP. An example of CTCA may comprise a plurality of application program interfaces (APIs), an API for each presentation application, an API for a PDF reader, an API for a slide presentation application such as Microsoft POWERPOINT, an application for a spreadsheet application such as Microsoft EXCEL®, etc. A PDF reader may be an ACROBAT® Reader application. (ACROBAT is a registered trademark of Adobe Inc.; POWERPOINT and EXCEL are registered trademarks of Microsoft Corporation.)

Yet in some embodiments, in parallel or in sequence to sending the content file, the CTCA may be adapted to collect, by using the relevant API, control signals that are used by the conferee while presenting the content on the CC. Control signals such as: page up, down, next page, markers, the location of the cursor, etc. The collected control signals may be transmitted toward the CTM at the CTEP and from the CREP to be sent toward a CREP or an MCU. Further, in some embodiments the API may comprise a section that is configured to follow user's activity on the presented content. The API may communicate with the operating system of the CC and collect signals from drivers of the human-interfaces devices such as a mouse, a keyboard, a touch screen driver, etc. The obtained signals may be converted to the control signals that may be used the system.

The CTM may be adapted to establish an additional connection for carrying the content in its original format (a PDF file, a PowerPoint deck, an Excel spreadsheet, etc.) and the collected control signals. The additional connection may be based on real-time-transport protocol (RTP) and real-time-transport-control protocol (RTCP). The additional connection may be between a CTM at a CTEP and a content-receiving module (CRM) at a CREP in case of a point-to-point (P2P) session. In case of multipoint conferencing, the additional connection may be between a CTM at a CTEP and an MCU or an MRM.

The CRM may comprise a plurality of APIs, one per each application. By using the appropriate API, the CRM may be adapted to obtain the content file in its origin format, invoke the appropriate application in the RCEP, and instruct the invoked application to present the content based on the received control signals. The content may be presented on a second display unit that is associated with a first display unit that presents the video image. In some CREP in which a single screen is used, a portion of the screen may be allocated for presenting the content and the rest of the screen may be used for presenting the video image of the presented conferees. Further, in some embodiments in which the API between the CRM and the relevant application is limited, in such a case, the CRM may be configured to add a layer on the display of the content. The layer may be used for presenting controls that cannot be implemented by the API, control such as but not limited to markers, pointers, etc. Further, in some embodiments the API may comprise a section that is configured to follow user's activity on the presented content. The API may communicate with the operating system of the CC and collect signals from an appropriate driver such as the mouse, the keyboard, the touch screen driver, etc. The obtained signals may be converted to the control signals that may be used at the CREP. Adding a layer on the video may be similar to adding other graphic layer above the video image that is well used in video conferencing systems. A reader who wishes to learn more about adding a layer above the video image is invited to read a U.S. Pat. No. 7,542,068, the content of which is incorporate herein by reference.

Some limited CREPs do not have plurality applications that may be used for presenting content in its original file format. In case that such a limited CREP participates in a video conferencing that involves delivering of content in its original file format, then a transformation is needed for transforming the content from its original format into a format that may be used by the limited CREP. In one embodiment, an MCU may be adapted to convert the received content from the CTEP, in its original format with the control signals, convert it to a video image, and present the video image of the content with the control signals, as a video image in a segment of the continuous presence video image, as it is done today.

In alternate embodiment of and MCU, the MCU may communicate with the limited CREP for determining whether the CREP has at least one popular presentation application, such as but not limited to Acrobat, PowerPoint, HTML, for example. In case that the CREP has one of those applications, the MCU may be configured to convert the content from its original format into the one that may be implemented by the CREP. In some embodiments, the CTEP may convert the file into PDF, for example.

Examples of content delivering system may be configured to operate in media relay videoconferencing in which an MRM and MREs are used. A content transmitting media relay endpoint (CTMRE) may be adapted to include a CTM, which may be similar to a CTM of a CTEP. In addition, an example of an MRM may be configured to receive, over a dedicated connection, the content from the CTM that is located at the CTMRE. The content is transmitted in its original format as it is disclosed above in conjunction with an MCU. The MRM may be configured to relay the received content and control signals to one or more content receiving media relay endpoints (CRMREs). An example of a CRMRE may comprise a CRM, which may be similar to the CRM of a CREP. The CRM may receive the content in its original format with the control signals and process it in a similar way that is done in the CREP. The content may be presented on a second display unit or may share a single display unit of the CRMRE with the video.

FIG. 1 illustrates a block diagram with relevant elements of a portion of a multimedia multipoint conferencing system 100 according to one embodiment of a videoconferencing system capable of sending original application content. System 100 may comprise a network 110, connecting one or more MCUs or MRMs 120a-c, a plurality of CREPs 133 and a CTEP 131. The CTEP 131 may be associated with the CC 140. In some embodiments in which network 110 includes a plurality of MCU/MRMs 120, a virtual MCU (not shown) may be used for controlling the plurality of MCUs 120. More information on a virtual MCU may be found in U.S. Pat. No. 7,174,365, which is incorporated herein by reference in its entirety for all purposes. In some embodiments of system 100, one of the MCUs 120 may perform the functionality of the virtual MCU and may control the rest of the MCUs 120. An endpoint 131 or 133 (which may be referred to as a terminal) is an entity on the network, capable of providing and receiving real-time, two-way content, audio, and/or visual communication with other endpoints or with the MCU 120. An endpoint 131 or 133 may be implemented by a computer; a PDA (personal digital assistant); a cell phone; a tablet, a TV set with a microphone and a camera, etc.

In addition to common operation of a video conferencing endpoint or a media relay endpoint, an example of a CTEP 131 may be configured to handle content in its original format. An example of CTEP 131 may be configured to communicate with an associated CC 140 over an IP connection 145 or a LAN, for example. When a conferee that is associated with CTEP 131 is willing to share a content file with the other conferees that participate in the videoconferencing session, the conferee, by using the CC 140, may make a connection 145 with the CTEP 131. The connection may be an IP connection over the Internet or an Intranet. In other embodiments, the CC 140 and the CTEP 131 connection 145 may be over a LAN and the connection may be based on the communication protocol used over the LAN, for example an Ethernet protocol.

The CC 140 may be a personal computer, a laptop, a notebook, a tablet, a smart phone or any other computing device with data communication capabilities. In one embodiment, the CC 140 and the CTEP 131 may be embedded in the same device. In such an embodiment, the connection 145 may be a shared memory located at the same device, for example.

Upon establishing the connection 145 between the CC 140 and the CTEP 131, a CTCA may be installed or otherwise loaded on the CC 140. The CC 140 with the CTCA may be configured to perform actions comprising actions that cause the CC 140 to instruct the conferee to select the requested content file and to open it by using an appropriate viewer application that may process and display the content in its original file format. A viewer application may be a spreadsheet application, such Microsoft Excel for example, a presentation reader such as Microsoft PowerPoint, a PDF viewer such as Adobe Reader, etc. When the content file is selected, the CC 140 may be adapted to fetch the file from a CC 140 memory device (not shown in the drawings) and send it toward the CTEP 131. Sending the content file may be offline, for example via an email. Alternatively, the content file may be sent online over the connection 145.

One embodiment of a CC 140 may comprise a plurality of transmitting application program interfaces (tAPIs), a tAPI for each viewer application, e.g., a tAPI for a PDF viewer, a tAPI for a PowerPoint viewer, etc. An example PDF viewer is ACROBAT® Reader. (ACROBAT is a registered trademark of Adobe Inc.) The relevant tAPI may collect the user activities on the presented file and transfer information regarding those activities as control signals toward the CREP 133 directly (for a P2P session), or via an intermediate node, such as an MCU/MRM 120a-c for example, for a multipoint videoconferencing session. The user activity may include scrolling through the content, marking an area of the content, pointing at an area of the content, moving a cursor on the content, etc.

The CTEP 131 may be configured to establish an additional connection 135 between the CTEP 131 and the MCU or MRM 120, or directly with a CREP 133 for carrying the content in its original format and the collected control signals. The additional connection 135 may be based on a real-time-transport protocol (RTP) and a real-time-transport-control protocol (RTCP). More information on the operation of CC 140 and CTEP 131 is disclosed below in conjunction with FIG. 2 and FIG. 5.

One embodiment of a CREP 133 may comprise one or more application readers or viewers that may present and display content in its original formats. The application viewers may include PowerPoint viewers, PDF readers, spreadsheet viewers, etc. Each application may be associated with a receiving API (rAPI). The rAPI may be configured to receive the collected control signals that were sent from the CC 140 via the CTEP 131, process those control signals and employ those instructions on the application reader that is used to display the content file in its original format. Thus, the content that is currently presented on a display unit associated with the CREP 133 follows the presentation displayed on the CC 140.

The content may be presented on a second display unit associated with the CREP 133 that is associated with a first display unit, which presents the video image. In some embodiments of CREP 133, in which a single screen is used, a portion of the screen may be allocated for presenting the content and the rest of the screen may be used for presenting the video image of the presented conferees. Further, in some embodiments, in which the rAPI is limited, the CREP 133 may be configured to add a layer on the displayed content. The layer may be used for presenting effects or the results of the user's activity that cannot be presented by the API, user's activities such as but not limited to markers, pointers, etc.

In some embodiments, the tAPI may comprise a section that is configured to follow a user's activity on the presented content. The tAPI may communicate with the operating system of the CC 140 and collect signals from an appropriate driver such as the mouse, the keyboard, the touch screen driver, etc. The obtained signals may be converted to the control signals that may be used at the CREP 133. In a similar way the rAPI may be configured to include instruction that may cause a processor in the CREP to obtain the control signal process them and present the user activity on the added layer. Adding a layer on the presented content may be similar to adding other graphic layer above the video image that is well used in video conferencing systems. More information on the operation of CREP 133 is disclosed below in conjunction with FIG. 4 and FIG. 7.

An MCU or MRM 120 may be used for managing the videoconference sessions. In addition to common operation of an MCU or an MRM for managing a videoconferencing session between a plurality of endpoints or media relay endpoints, the MCU or MRM 120 may be configured to relay content files in their original format as well as the API control signals from the CTEP 131 toward one or more CREPs 133. More information on the operation of an intermediate entity such as an MCU or an MRM 120 is disclosed below in conjunction with FIG. 3 and FIG. 6.

Figure 2:
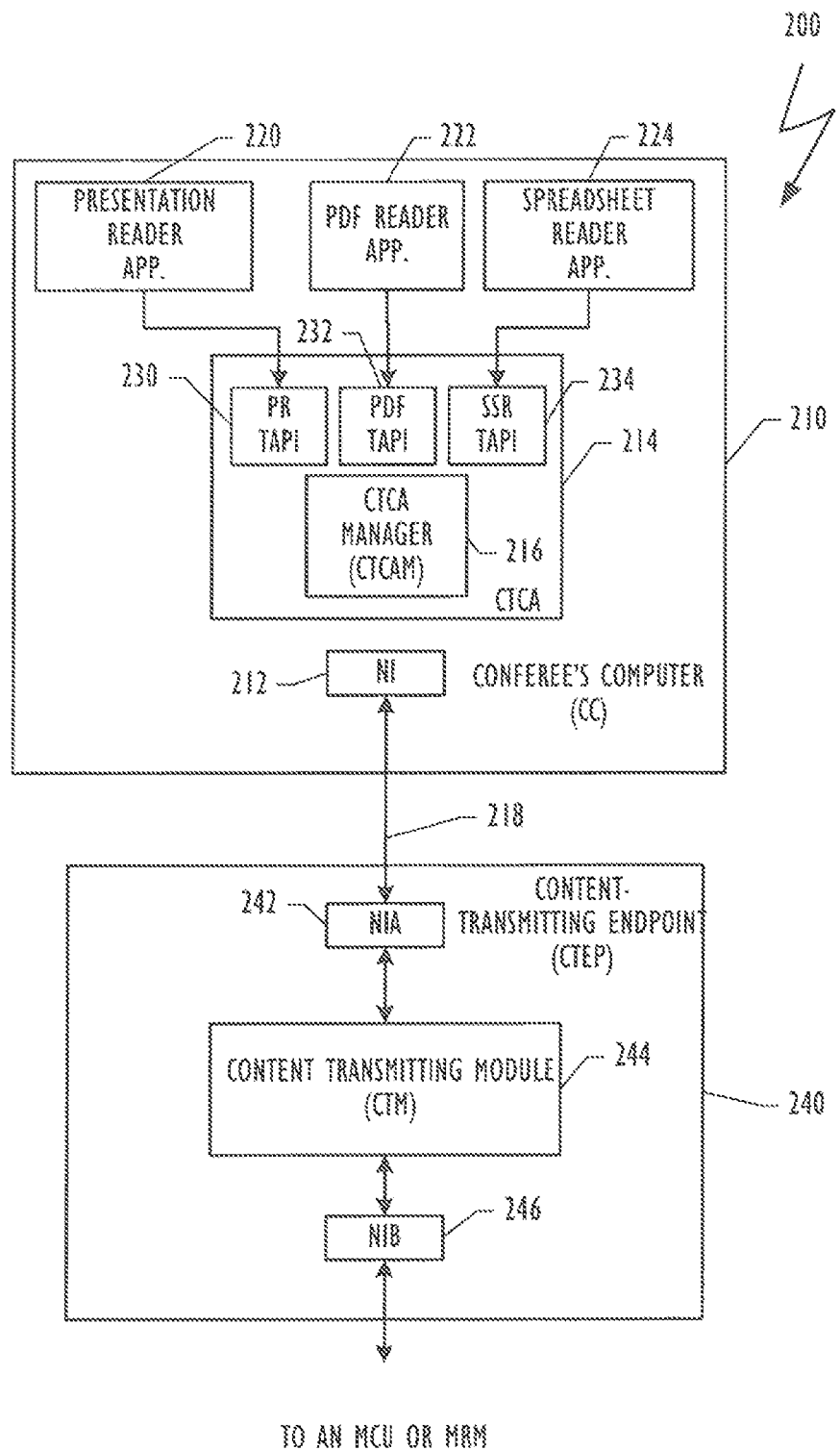
FIG. 2 schematically illustrates a simplified block diagram with relevant elements of an embodiment of a conferee's computer and a content transmitting endpoint according to one embodiment.

FIG. 2 illustrates a simplified block diagram with relevant elements of a content transmitting system 200. The system 200 may comprise a CC 210 and a CTEP 240 according to one embodiment. The CC 210 may be a personal computer, a laptop, a notebook, tablet, a smart phone, or any other computing device with data communication capabilities. In one embodiment, the CC 210 and the CTEP 240 may be included in the same device. Among other components of a computing device, a CC 210 may comprise one or more processors, computer readable media such as a read/write hard disc, CDROM, Flash memory, ROM, or other memory or storage, etc. (not shown in the drawings) Software of a logical module may be embodied on one of the computer readable media. In order to execute a certain task, a software program may be loaded to an appropriate processor as needed.

An example of CC 210 may comprise one or more applications 220, 222, and 224 that may be used for presenting content. CC 210 may include a presentation reader application 220, a PDF reader application 222, and/or spreadsheet reader application 224, for example. In addition, the CC 210 may comprise a network interface (NI) module 212 that is used for data communication with other computing devices. The data communication may be over an IP network, a LAN, etc. In an embodiment in which the CC 210 and the CTEP 240 are embedded in a single device, the NI 212 may be a shared memory or an internal bus of the single device.

In addition to common logical modules that are included in the CC 210, an additional logical module, a content transmitting client agent (CTCA) 214 logical module, may be loaded to the CC 210. Loading the CTCA 214 may be done by the conferee that wishes to present the content to the other participants in the videoconferencing. Loading the CTCA 214 to a processor of CC 210 may be done from one of the memory devices (not shown in the drawings) of the CC 210. Alternately, the CTCA 214 may be downloaded from the CTEP 240, after establishing the connection between the two units. An embodiment of a CTCA 214 may comprise one or more transmitting application program interface (tAPI) modules 230, 232, and 234. Each tAPI module may be associated with its related application. For example, slide deck tAPI 230 is associated with a slide presentation reader application 220, PDF tAPI 232 is associated with PDF reader application 222, and spreadsheet reader tAPI 234 is associated with spreadsheet reader application 224, etc.

In addition to the tAPI modules 230, 232, and 234, an example of CTCA 214 may comprise a CTCA manager (CTCAM) 216. An embodiment of the CTCAM 216 may be configured to perform actions comprising actions that cause the CTCA 214 to instruct the NI 212 to create an additional communication link over connection 218 with the CTEP 240. The additional communication link may be used for transferring the content in its original format and the tAPI-instructions for restoring the presenting conferee's activity on the presented content. Such activity may include marking an area on a presented slide. The communication over the communication link 218 may be based on RTP and RTCP, in some embodiments. In alternate embodiments, the communication over the communication link 218 may be based on asynchronous communication protocols, such as XML or AJAX.

According to the type of a selected content file, CTCAM 216 may instruct the relevant tAPI module, 230, 232, or 234, to fetch the selected file from the CC 210 memory device and transfer a copy of the content file in its original format over the connection 218 toward the CTEP 240. In some embodiments, transferring the content file toward an MCU 120 or a CREP 133 may be done offline by an email.

In some embodiments, each fetched content file may be converted by CTCAM 216 into a popular type format, such as a PDF format. PDF is a very popular file format. Many computing devices, as well as the CREP 133, may have a PDF reader application that may be used for presenting the transferred content file.

After transferring the content file, the CTCAM 216 may prompt the conferee to start the content presentation. Next the relevant tAPI may be instructed to open the fetched content file, and to start to obtain data regarding the conferee's activity. The data regarding the activity may be transferred by the relevant tAPI modules 230-234 toward the CTCAM 216 that convert them into instructions that are sent via the NI module 212, the CTEP 240, and the MCU 120 toward one or more CREPs 133, where the received instructions may be converted into the presentation format and be displayed on a display unit of the CREP 133. The CTCA 214 may be active as long as the content presentation session is active. At the end of the content presentation session, the CTCA 214 may be released.

Referring now to the CTEP 240, among other elements of a video conferencing endpoint, an example of a CTEP 240 may comprise a content transmitting module (CTM) 244 and two NI modules 242 and 246. NIa 242 may be used for data communication with CC 210. The data communication may be over an IP network, a LAN, etc. In an embodiment in which the CC 210 and the CTEP 240 are embedded in a single device, the NIa 242 may be a shared memory or an internal bus of the single device. The second NIb 246 may be used for data communication with an MCU 120 or directly with a CREP 133, if the communication session is a P2P session. The data communication may be over an IP network. The communication over the two NI modules 242 and 246 may be based on an asynchronous protocol, such as, but not limited to, RTP and RTCP.

An example of a CTM 244 may be configured to communicate with the CTCA 214 via NIa 242, communication link 218, and NI 212. When a conferee is willing to present a content file to the other conferees that participate in a videoconferencing session, the conferee, by using a browser application, for example, at CC 210, may create a connection with the CTM 244 at the associated CTEP 240. The connection may be an IP connection over the Internet or an Intranet. In other embodiments, CTCA 214 may be loaded from any type of computer readable media such as CDROM, Flash memory, etc.

CTM 244 may be a processor that executes a server application, for example a content transferring gateway application. The CTM 244 may serve as a gateway between the CC 210 and an MCU 120 or a CREP 133. In one embodiment, upon receiving a request from the browser application of CC 210 for fetching the software file of CTCA 214, CTM 244 may be configured to fetch the CTCA 214 software file from a memory device (not shown in the figures) of CTEP 240 and download it to CC 210. Next CTM 244 may establish an additional connection via NIb 246 to an MCU 120 or CREP 133, if using a point to point (P2P) session. The additional connection may be used for carrying the content in its original format and the collected control signals toward its destination.

During the ongoing content presentation, CTM 244 may be used as a relay that receives packets from CTCA 214 that carry payload that includes information regarding the activities of the presenting conferee on the presented content, such as, but not limited to, page-up, page-down, marker, etc. The CTM 244 may parse those packets, retrieve the payload, and send the payload in a new packet to the IP address of the relevant MCU 120 or a CREP 133 (in a P2P session). More information on the operation of CC 210 and CTEP 240 is disclosed below in conjunction with FIG. 5.

Figure 3:
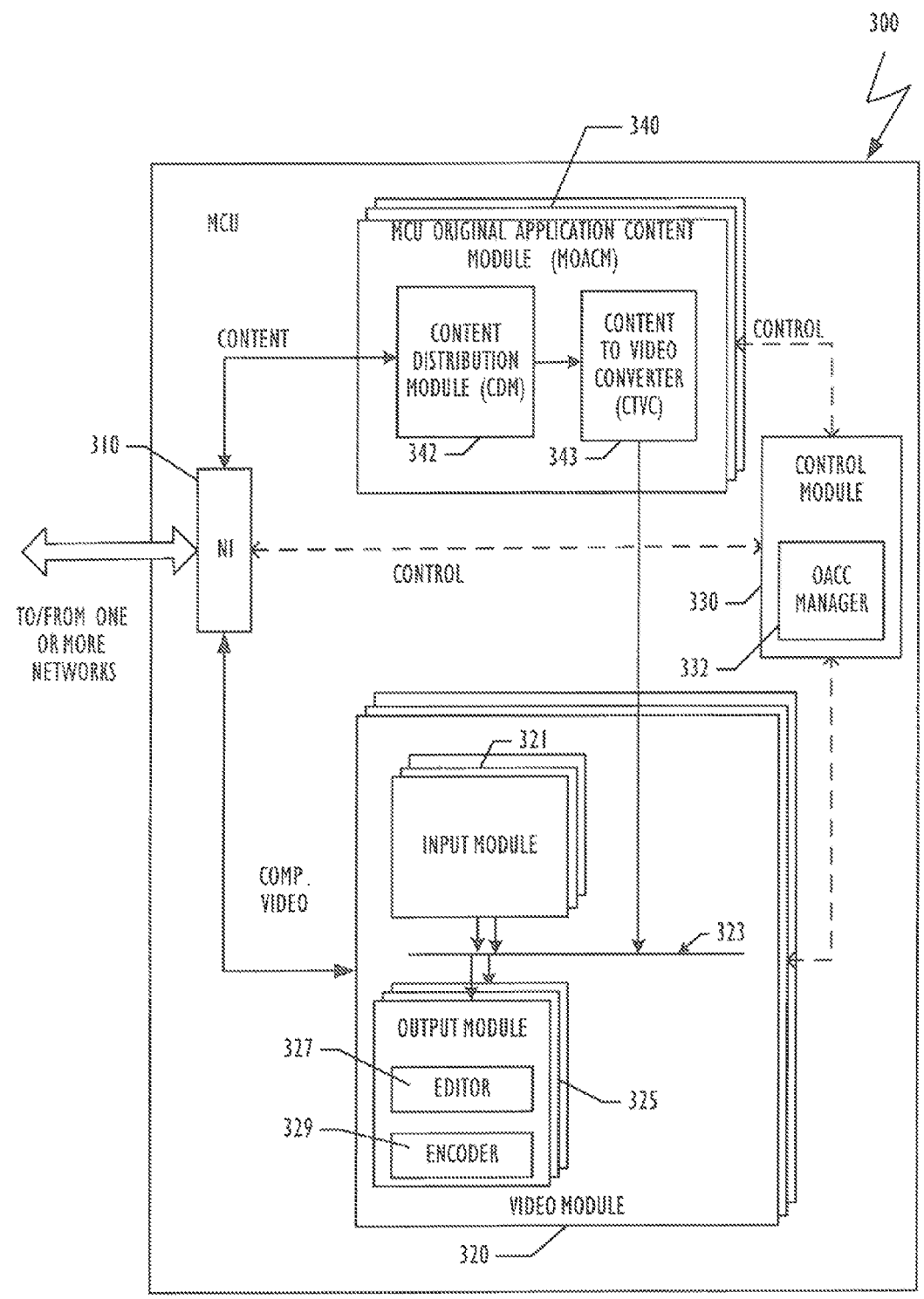
FIG. 3 schematically illustrates a simplified block diagram with relevant elements of an embodiment of an intermediate node according to one embodiment.

FIG. 3 schematically illustrates a simplified block diagram with relevant elements of an example embodiment of an MCU 300 serving as an intermediate control unit that is configured to operate in a videoconferencing system capable of sending original application content. An example embodiment of MCU 300 may comprise one or more processors, computer readable medium such as a read/write hard disc, CDROM, Flash memory, ROM, or other memory or storage devices, etc. Software of a logical module may be embodied on one of the computer readable medium. In order to execute a certain task, a software program may be loaded to an appropriate processor as needed. Among other logical modules of a common MCU, MCU 300 may comprise an NI module 310, one or more video module 320 (one per each active conference, for example), a control module 330 and one or more MCU original application content modules (MOACM) 340 (one per each active conference, for example). Other types of intermediate control units may be used, which may not be MCUs.

The NI module 310 may receive multimedia communication from a plurality of endpoints 131, 133 via networks 110. NI 310 may process the communication according to one or more communication standards such as, but not limited to, H.320, H.323, SIP, etc. NI 310 may also process the communication according to one or more compression standards such as, but not limited to, H.261, H.263, H.264, G711, G722, MPEG, etc. NI 310 may receive and transmit control and data information to and from other MCUs and endpoints. More information concerning the communication between endpoints and the MCU over network 110 and information describing signaling, control, compression, and creating a video call may be found in the international telecommunication union (ITU) standards H.320, H.321, H.323, H.261, H.263, H.264 G711, G722, and MPEG, etc. In addition, NI 310 is configured to receive from a CTEP 240 packets carrying a presentation file in its original file format as well as packets that carry payload with information regarding the activity of the conferee on the presented content.

NI module 310 may multiplex/de-multiplex the different signals, media and/or "signaling and control" that are communicated between the endpoints 131, 133 and the MCU 300. The compressed audio signal may be transferred to and from an audio module, which is not shown in the figures. The compressed video signal may be transferred to and from the video module 320. The "control and signaling" signals may be transferred to and from control module 330. Packets that were obtained from a CTEP 240 and carry content related data in an original file format of the content may be transferred toward the MOACM 340. Relayed packets received from the MOACM 340 that carry payload with data related to content in its original format may be transferred by NI 310 toward the appropriate CREPs 133. The data related to content may include data of the content file or information regarding the activity of the presenting conferee on the presented content.

Video module 320 may receive compressed video streams from the plurality of endpoints 131, 133, which are sent toward the MCU 300 via network 110 and processed by NI 310. Video module 320 may create one or more compressed continuous presence video images according to one or more layouts that are associated with one or more conferences currently being conducted by the MCU 300. A video module 320 according to one embodiment may have a plurality of input modules 321, a plurality of output modules 325, and a video common interface 323. Each input module 321 may be associated with an endpoint. Each output module 325 may be associated with one or more endpoints.

An input module 321 may be associated with an endpoint and may process compressed video images received from its associated endpoint. A decoder, not shown in the figure, may receive compressed video from an associated endpoint and may decode the compressed video into decoded video data. The decoded information may be stored in a decoder frame memory from which it is transferred toward one or more output modules 325 via common interface 323.

Among other elements, an output module 325 may include an editor module 327 and an encoder module 329. Editor module 327 may get decoded data of selected video images from the common interface 323 to be composed into a continuous presence video image to be transferred toward a receiving endpoint. The editor 327 may scale, crop, and place the video data of each conferee into an editor frame memory according to the location and the size of the image in the layout associated with the composed video of the continuous presence image. If one of the CREPs 133 cannot receive content in its original format, the content may be converted into a video image by a content to video converter (CTVC) 343 and the video image of the content may be sent toward the common interface 323.

If the CREP 133 cannot process content in its original format and must present the content in a segment of a continuous presence video image with the video images of presented conferees, an Editor 327, which is embodied in the relevant output module 325, may obtain the video image of the content from the common interface 323 and scale it into an appropriate size of the relevant segment in the continuous presence video image. The encoder 329 may obtain the decoded continuous presence video image with the content in one of the segments, compress it by using an appropriate compression standard, and send the compressed continuous presence video image toward the relevant one or more CREPs 133 via NI 310.

Alternatively, if the CREP 133 cannot process content in its original format but may present the content as video switching on a separate display unit, then an Editor 327, which is embodied in the relevant output module 325, may obtain the video image of the content from the common interface 323 and scale it into an appropriate resolution as it is required by the separate display unit, and the scaled video image of the content may be transferred toward the encoder 329. The encoder 329 may obtain the scaled video image of the content and compress it by using an appropriate compression standard. The compressed video image of the content may be sent toward the relevant one or more CREPs 133 via NI 310. The common interface 323 may comprise a TDM bus, a shared memory, or any common bus that may be used in a computing device.

If the intermediate node comprises an MRM instead of an MCU, the example embodiment of the MRM may omit the video module 320 and the CTVC 343. The MRM may just relay the content packets via a content distribution module (CDM) module 342.

An example of MOACM 340 may comprise a CDM 342 and a CTVC 343. In some embodiment of MOACM 340 the allocation of CDM 342 and/or CTVC 343 depends on the content capabilities of the CREPs that participant in a current conference. A CDM 342 may be allocated if at least one CREP 133 may accept content in its original file format and a CTVC 343 may be allocated if at least one CREP 133 cannot accept content in its original file format. An example of a CDM 342 may comprise a cyclic buffer that stores received packets that carry content in the original file format or carry information about the activity of the user on the presented content. The received packets were sent from a CTEP via the NI 310. Further, an embodiment of a CDM 342 may be configured to fetch the stored packets from the cyclic buffer, one after the other, and distribute them toward one or more CREPs 133 via the NI 310. In addition, when MOACM 340 comprises a CTVC 343, then the CDM 342 may be further configured to distribute the fetched packets also toward the CTVC 343.

An example of a CTVC 343 may be configured to obtain packets from the CDM 342 that carry content in its original format and/or information regarding the activity of the conferee on the presented content, in the conferees CC 210. The CTVC 343 converts the fetched data into a snapshot of the presentation image that is currently presented on the display unit of CC 210, and transfers the created image of the snapshot toward the video common interface 323. From the video common interface 323, the video image is fetched by one or more output modules 325 and from there the compressed video image is transferred toward one or more CREPs that operate in the tradition way.

In order to convert the content into video image, CTVC 343 may comprise one or more content presentation readers and a CRM that operates in a similar way to a CRM 420 of a CREP 400 that is disclosed below in conjunction to FIG. 4.

Control module 330 may be a logical unit that controls the operation of the MCU 300. In addition to common operation of a typical MCU, MCU 300 is capable of additional functionality as result of having the control module 330. Control module 330 may include an original-application-content controller (OACC) 332. During the set up process of a content session in a conference an example of OACC 332 may communicate with the CTEP and the one or more CREPs 133 in order to determine whether content may be transmitted in its original format and whether a CDM 342 and/or a CTVC 343 module are needed and be allocated accordingly. The OACC 332 may receive information and updates via the NI 310. Such information may include, but is not limited to: the number of sites that will participate in the conference call, which site has departed, which sites have been added, which site may process content received in its original file format, and so on.

The OACC 332 may instruct the NI 310 to set connections to carry the content in its original format with one or more CREPs 133, associate between the CDM 342 and the NI 310, allocated video resources in the video module 320 (if needed), for handling the content in the tradition way and associate the CTVC 343 with the allocated video resources. Upon determining that the content presentation session was terminated, OACC 332 may be adapted to release the allocated resources. More information about the operation of MCU 300 is disclosed below in conjunction with FIG. 6.

Figure 4:
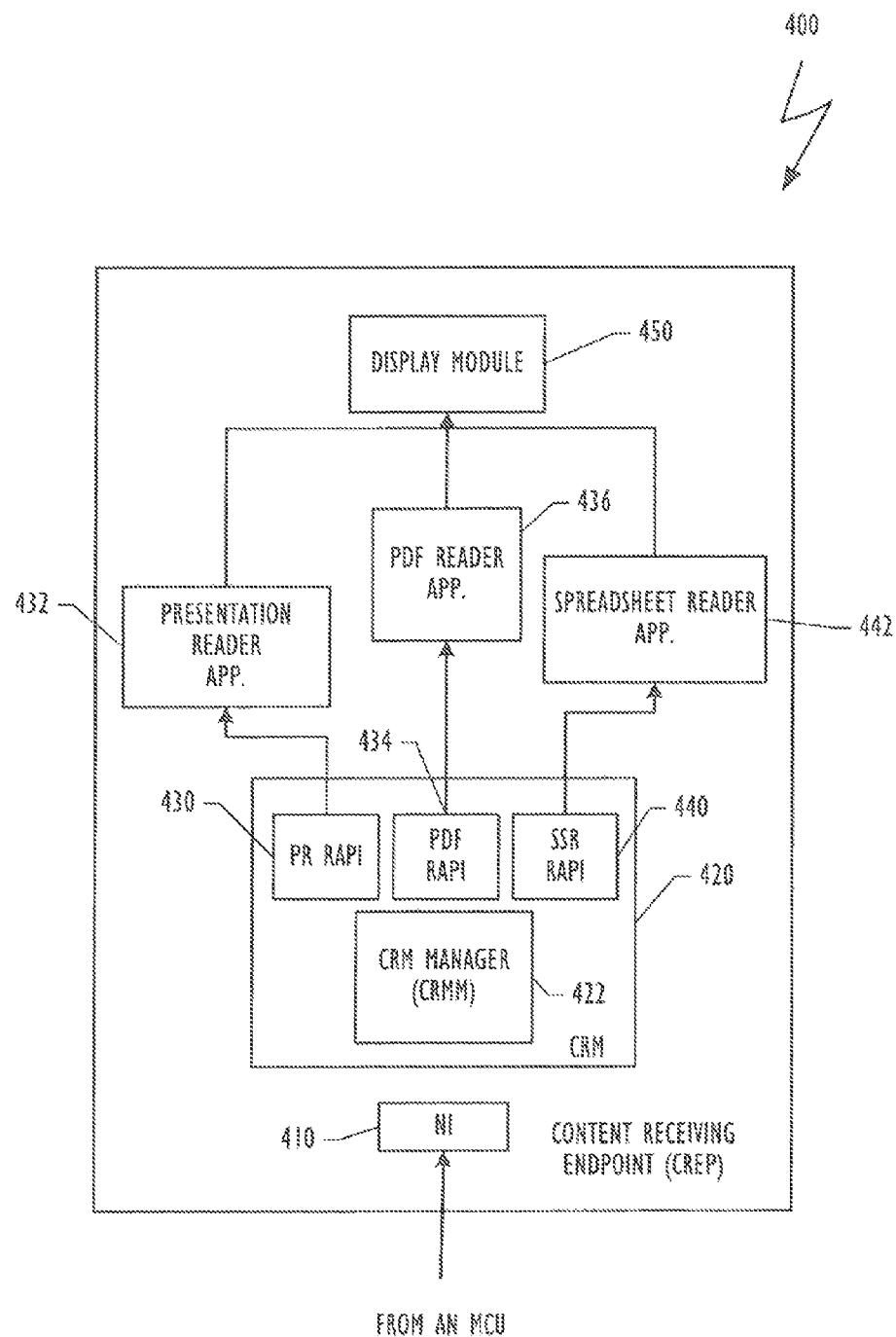
FIG. 4 schematically illustrates a simplified block diagram with relevant elements of an embodiment of a content receiving endpoint according to one embodiment.

FIG. 4 illustrates a simplified block diagram with relevant elements of a CREP 400. An embodiment of the CREP 400 may comprise a display module 450, one or more applications 432, 436, and 442 that may be used for presenting content, such as, but not limited to: a presentation reader application 432; a PDF reader application 436, such as a 3-Heights™ PDF Viewer; and/or spreadsheet reader application 442, for example. In addition CREP 400 may comprise an NI module 410 that is used for data communication with other computing devices. The data communication may be over an IP network, a LAN, etc. The display module may include a single screen. In such an embodiment of a CREP 400, a portion of the screen may be allocated for presenting the content (after being processed by the appropriate application 432, 436, or 442, for example) and the rest of the screen may be used for presenting the continuous presence video image of the presented conferees. In other embodiments, the display module may comprise two screens. One may be used to display the continuous presence video image and the other may be used for presenting the content after being processed by the appropriate application 432, 436, or 442.

In addition to common logical modules that are included in a common endpoint, additional logical modules are added in order to present content received in its original format. The additional modules may include a CRM 420. An example of a CRM 420 may comprise one or more rAPI modules 430, 434 and 440, for example. The rAPI may be similar to API codes that are associated with presentation application readers that are embedded in "Open-Office" software suite. Each rAPI module may be associated with its relevant application. For example, a slide deck rAPI 430 is associated with a slide presentation reader application 432, PDF rAPI 434 is associated with PDF reader application 436, and spreadsheet rAPI 440 is associated with spreadsheet reader application 442. By using the appropriate rAPI the CRM 420 may be adapted to obtain the content file in its original format, invoke the appropriate application, and instruct the invoked application to present the content in a similar file view as the content presented over the display unit of the CC 210, based on the received control signals.

In addition to the rAPI modules 430, 434 and/or 440, an example of CRM 420 may comprise a CRM manager (CRMM) 422. An example CRMM 422 may be configured to perform actions comprising actions that cause the CRM 420 to instruct the NI 410 to set an additional communication link with an MCU 120. The additional communication link may be used for receiving the content in its original format and information regarding the activity of the presenting conferee on the presented content. This information and the content may be transferred toward the appropriate rAPI that accordingly instruct the relevant application reader to restore the image (view) of the content presented on the screen of the CC 210. The presenting conferee's activity may be such as, but not limited to, marking an area on a presented slide, page-up, page-down, etc. The communication with the MCU 120 may be based on RTP and RTCP, for example.

Further, in some embodiments in which the rAPIs 430, 434 and/or 440 are limited, the CRM 420 may be configured to add a layer on the display of the content. The layer may be used for presenting user activity that cannot be presented by the rAPI, activity such as but not limited to markers, pointers, circles, etc. Adding a layer on the video may be similar to adding other graphic layers above the video image that is commonly used in video conferencing systems. More information on the operation of an example of CREP is described below in conjunction with FIG. 7.

Figure 5:
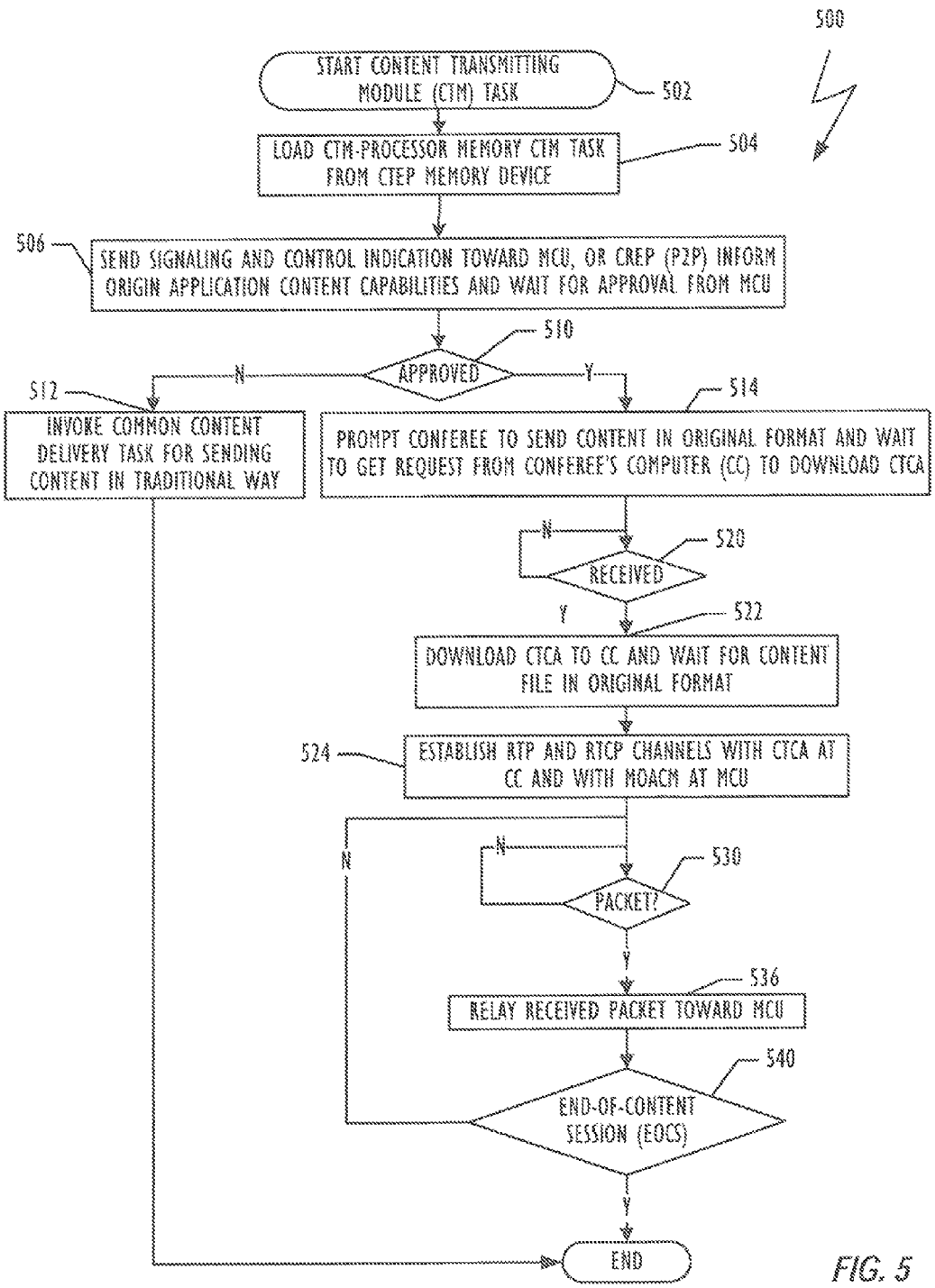
FIG. 5 is a flowchart illustrating relevant actions of a method that may be used for content transmitting that may be implemented by a content transmitting endpoint according to one embodiment.

FIG. 5 is a flowchart illustrating relevant actions of a process 500 for transmitting content that may be implemented by a CTM 244 in a CTEP 240, for example. Process 500 may be initiated in block 502 when a conferee that is associated with the CTEP 240 (the presenting conferee) is willing to present content and informs a processor of the CTEP 240 about the conferee's request to present the content. As a result, a CTM program 504 may be loaded to the processor from a memory device of CTEP 240, for implementing the actions that are needed for employing the process 500.

At block 506 CRM 244 may send a signaling and control indication toward an MCU 120 asking the MCU 300 whether an original format content presentation session may be established. If 510 the MCU 300 rejects the request, then at block 512 the common content delivery task may be invoked for transmitting the content as a video image in the traditional way and process 500 may be terminated. A rejection may be sent from an MCU 300 that was not configured to handle a content presentation in its original format. In some embodiments, such as a P2P videoconferencing for example, the MCU 300 may be replaced by a CREP 133.

If in block 510 the MCU 300 agrees to handle the content in the original format, then at block 514 process 500 may prompt the presenting conferee to send the content in its original format from the CC 210. In addition a hyper-link may be presented to the conferee informing the conferee about an IP address from which a CTCA 214 may be downloaded to the CC 210. Then process 500 may wait in block 520 for receiving a request from the CC 210 to download the CTCA logical module 214. Upon receiving the download request, CTM 244 may fetch the CTCA module from the CTEP 240 memory device and download it to the CC 210 in block 522.

Next, process 500 may establish in block 524 a communication channel with the CTCA 214 for obtaining packets that carry the content file as well as tAPI information regarding the operation of the presenting conferee. A second communication channel may be established in block 524 with the MOACM 340 at the MCU 300 for transferring the content and the information about the activity of the presenting conferee on the presented content. The communication channel may be based on RTP and RTCP, for example. In some embodiments, the content file may be sent as an email from the CTCA 214 toward the MCU 300, while the tAPI information may be sent over the RTP and the RTCP connection.

Next at block 530, process 500 may wait for receiving packets over the established connection via NIa 242. Each received packet is relayed in block 536 via NIb 246 toward the MOACM 340 at the MCU 300 and process 500 may check in block 540 whether an indication of end of content session is received from CTCA 214. If not, process 500 returns to block 530 for processing the next received packet. If the end of content session indication is received, then the relevant resources may be released and process 500 may be terminated.

Figure 6:
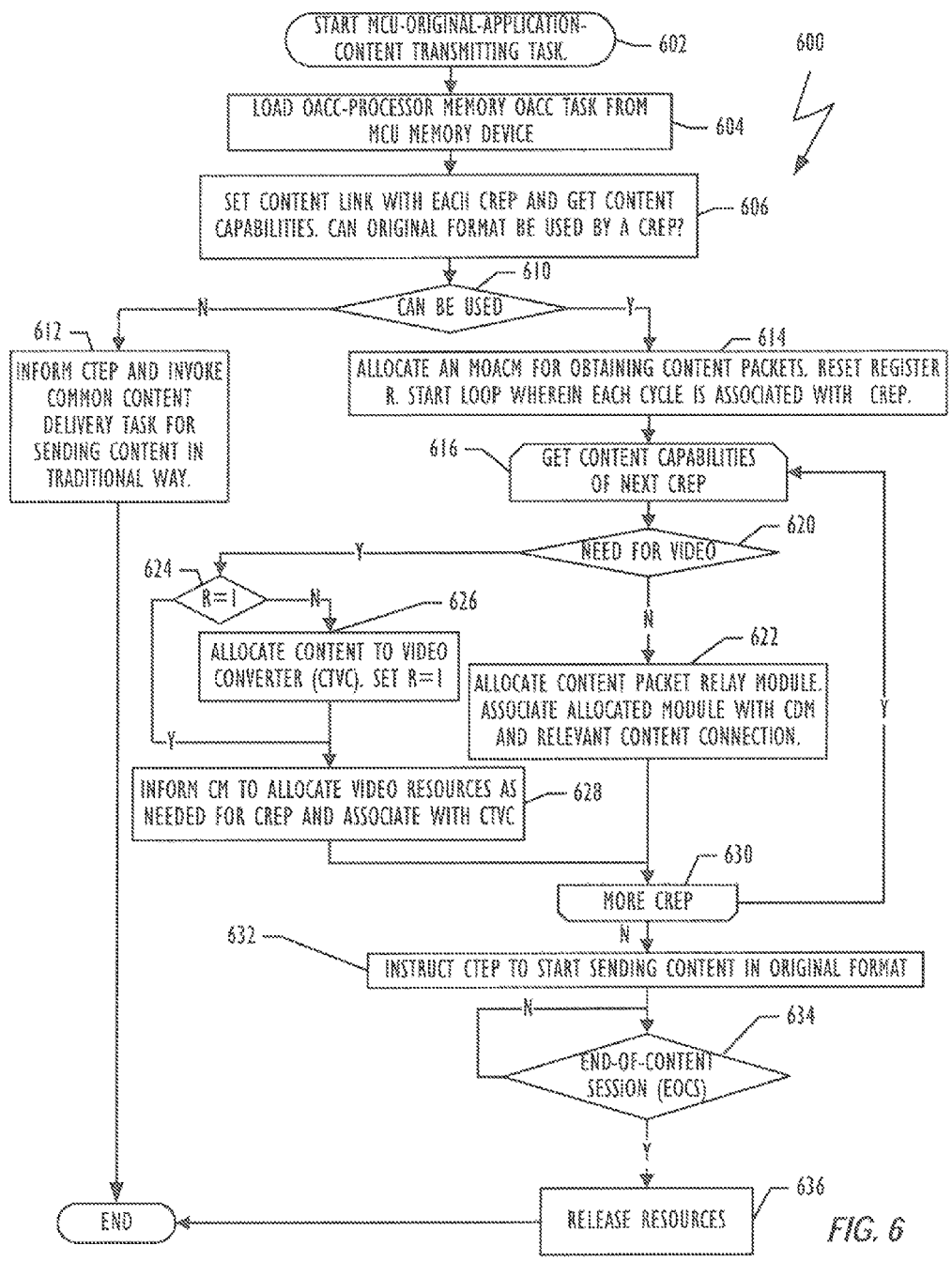
FIG. 6 is a flowchart illustrating relevant actions of a method that may be used for content receiving and transmitting that may be implemented by an MCU according to one embodiment.

FIG. 6 illustrates a flowchart with relevant actions of a process 600 for content receiving and transmitting that may be implemented by an MCU 300 according to one embodiment. Process 600 may be initiated 602 after control module 330 obtains the signal and control indication that was sent from the CTEP 240 at block 506 requesting the MCU 300 to establish a content session in the original format. After approving the request of the CTEP 240, an OACC module 332 may be allocated and an OACC program may be loaded in block 604 from a memory device of MCU 300 to a processor of the MCU 300 that will handle the content session.

At block 606, OACC 332 may instruct the NI 310 to send a signaling and control indication to each one of the CREPs 400 for checking whether the CREP 400 may process content in its original format. After collecting the responses from the CREPs 400, a decision may be made in block 610 whether content in its original format may be used. If so, at least one CREP 400 may process the content in the original format. Alternatively, if none of the CREPs 400 may process content in the original format, thus the content in the original format cannot be used, then the CTEP 240 may be requested in block 612 to send the content in the traditional way of sharing content in a video conference and OACC 332 may invoke the common content delivery task for receiving and sending content in the traditional way. Next the resources of the OACC 332 may be released and process 600 may be terminated.

If the decision is made in block 610 the content in its original format may be used, then OACC 332 may allocate computing resources and storage resources for the MOACM 340 and an MOACM program may be loaded in block 614 from a memory device of MCU 300 to the allocated computing resources of MOACM 340 that will handle the content session. A register R may be reset. Register R may be used for indicating that a CTVC 343 has been already allocated. Next, a loop may be initiated between block 616 and block 630, wherein each cycle in the loop is associated with a CREP 400.

At block 616, the content capabilities of the next CREP 400 is checked in order to determine whether the CREP 400 may process content in its original format or it needs the content as a video stream. If in block 620 the CREP 400 cannot process content in its original format and requires that the content will be converted to a video stream, then the value of register "R" is checked in block 624. If the value is true (R=1), then process 600 proceeds to block 628. If block 624 determines the value is false (R=0), then in block 626, resources for converting the content from its original format into video (CTVC 343) may be allocated to MOACM 340. The allocation may comprise loading an appropriate application that may process the original format, for example, a PDF reader. An rAPI may be loaded too. The rAPI may translate the presenting conferee activity on the currently presented content. After allocating the CTVC 343 resources, the register "R" may be set to true (R=1) in block 626.

Next, OACC 332 may request in block 628 the control module 330 to allocate video resources and NI resources for handling the video stream of the content that is targeted toward that CREP 400. The video resources depend on the capabilities of that CREP 400. If the CREP 400 uses a separate display unit for presenting the video stream of the content the video resources is just an encoder that matches the compression needs of the CREP 400. The NI resources may comprise a communication channel based on RTP for carrying the content and an RTCP channel for managing the traffic over the RTP channel. If the CREP 400 displays the content in a segment in a continuous presence video image, then the editor 327 of the appropriate output module 325 may be informed in block 628 about the content segment and the relevant section of the common interface 323 that is allocated for the video stream of the content. The section in the common interface 323 may be a time slot, where the common interface 323 is a TDM bus, or interval of addresses, when the common interface 323 is a shared memory, etc. There is no need for NI resources for such a case. Then a decision is made in block 630 whether an additional CREP 400 exists. If yes, then process 600 returns to block 616 for handling the next CREP 400.

Returning now to block 620, if the CREP 400 may process content in its original format, then at block 622 the NI module 310 may be instructed to establish an RTP channel and an RTCP channel with that CREP 400. Next, a content packet relay module may be allocated in block 622, in MOACM 340. The content packet relay module may be instructed to fetch packets carrying content or tAPI information from the cyclic buffer of the CDM 342, adapt the header of the packets according to the IP address and port of the CREP 400, and transfer the packets, one after the other, toward the CREP 400 via the NI 310 and the two allocated channels, and process 600 may proceed to block 630.

If in block 630 there are no additional CREPs 400, then OACC 332 may instruct the CTEP 240 to start sending packets that carry content in its original format and packets that carry tAPI information to be relayed toward the CREP 400 and process 600 may wait in block 634 to receive an end of content session indication. in block 636, upon receiving the end of content indication, process 600 may release the resources that were allocated for handing the content session and terminate.

Figure 7:
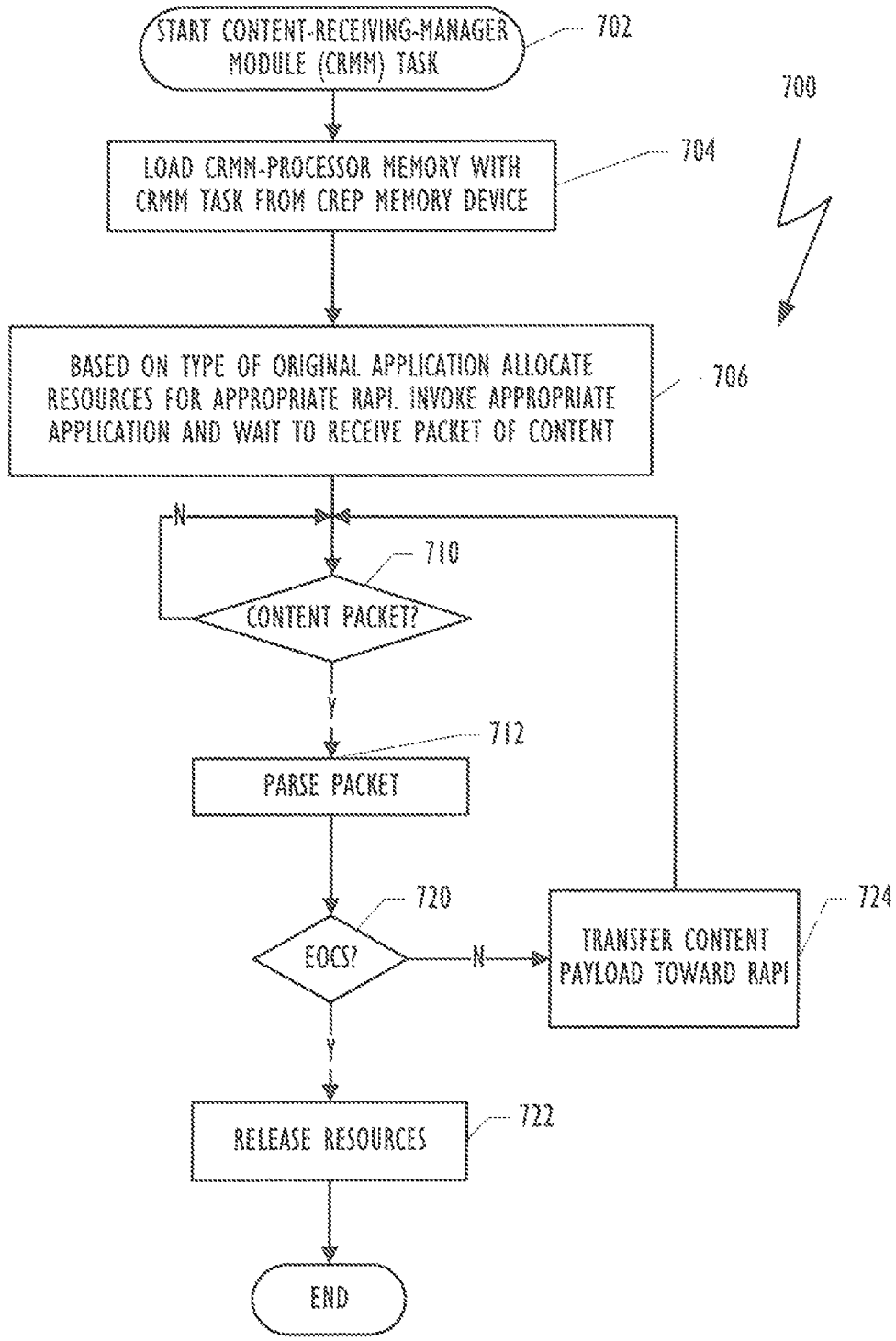
FIG. 7 is a flowchart illustrating relevant actions of a method that may be used for content receiving and presenting that may be implemented by a content receiving manager module according to one embodiment.

FIG. 7 illustrates a flowchart with relevant actions of a process 700 for handling content in its original format by a CREP 400 according to one embodiment. Process 700 may be initiated in block 702 after a control module (not shown) of the CREP 400 obtains a signal and control indication from an MCU 300 requesting to establish a content session in an original file format with the CREP 400. After approving the request of the MCU 300, resources for a CRMM 422 may be allocated and a CRMM program may be loaded in block 704 from a memory device of CREP 400 to a processor of the CREP 400 that will handle the content session.

At block 706, based on the type of the original file format of the content, CRMM 422 may allocate computing and storage resources for the appropriate reader application (432, 436, and 442) and its associated rAPI (430, 434, or 440, respectively). Then, the reader application and the appropriated rAPI may be invoked from a memory device (not shown) of the CREP 400. The rAPI may be adapted to accept a payload of packets received from the CTEP 240 via the MCU 300. The payload may comprise data of the content file and information about the activity of the presenting conferee on the presented content, such as page-up, page-down, marking, etc. The content and the activity information may be processed into a format that the application reader may use in order to present the content with the presenting conferee's activity on a display unit 450 of the CREP 400.

In some embodiments, in which the tAPI or the rAPI have limited functionality, the rAPI may be configured to place a layer on the presented content. In such a case, the tAPI may be configured to follow the user's activity on the presented content. The tAPI may communicate with the operating system of the CC 140 and collect signals from appropriate human-interface drivers such as the mouse, the keyboard, the touch screen driver, etc. The obtained signals may be converted to control signals that may be used at the CREP 400. In a similar way the rAPI may be configured to include instruction that may cause a processor in the CREP 400 to obtain the control signals, process them, and present the user activity on the added layer.

At this point of time the CREP is ready and may wait at block 710 for obtaining packets carrying content and information about the conferee's activity. The received packet may be parsed in block 712 by the CRMM 422 in order to determine in block 720 whether the received packet includes an end of content session indication. If found, CRMM 422 may stop the content presentation and release in block 722 the resources that were allocated for handling the content in the CREP 400 and process 700 may be terminated. If the received packet does not include an end of content session indication, then the content of the payload is transferred in block 724 via the invoked rAPI toward the invoked application reader for further processing in order to present the content file view on the display unit 450 with a similar appearance as the file view on the display unit of the CC, and process 700 returns to block 710 for handling the next packet.

It will be appreciated that the above-described apparatus, systems, and methods may be varied in many ways, including changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure may be implemented by combination of features and elements that have been described in association to different embodiments in the disclosure. The scope of the invention is limited only by the following claims and equivalents thereof.

While certain embodiments have been described in details and shown in the accompanying drawings, it is to be understood that such embodiments are merely illustrative of and not devised without departing from the basic scope thereof, which is determined by the claims that follow. In the appended claims, the terms "including" and "in which" are used as the plain-English equivalents of the respective terms "comprising" and "wherein".

The invention claimed is:

1. A videoconferencing system, comprising:
 a content transmitting endpoint having a content transmitting module;
 a content transmitting client agent, configured for installation on a presenting conferee's computer, the content transmitting client agent further configured for:
  accessing content presented on the presenting conferee's computer; and
  transmitting to the content transmitting module the presented content in its original file format and associated information regarding activity of the presenting conferee on the presented content; and
 a content receiving endpoint comprising:
  a display unit;
  a content receiving module, configured to receive the presented content and associated information transmitted from the content transmitting module; and
  a presentation reader module configured to present on the display unit similar presented content and the activity of the presenting conferee on the presented content as it is displayed on a display unit of the presenting conferee's computer.

2. The system of claim 1, wherein the presenting conferee's computer is embedded in the content transmitting endpoint.

3. The system of claim 1, wherein the activity of the presenting conferee comprises marking an area of the presented content.

4. The system of claim 1, wherein the activity of the presenting conferee comprises pointing at an area of the presented content.

5. The system of claim 1, wherein the activity of the presenting conferee comprises scrolling through the content.

6. The system of claim 1, wherein the presentation reader module comprises a portable document format reader.

7. The system of claim 1, wherein the presentation reader module comprises a spreadsheet reader.

8. The system of claim 1, wherein the content transmitting client agent is configured to perform actions comprising actions that cause the content transmitting client agent to:
 deliver data of a content file in its original file format toward the content transmitting module at the content transmitting endpoint;
 obtain information regarding the activity of the presenting conferee on the presented content; and
 deliver the obtained information toward the content transmitting module at the content transmitting endpoint.

9. The system of claim 8, wherein the content transmitting client agent at the content transmitting endpoint is configured to:
 obtain presented content of a content file in its original format;
 obtain associated information regarding the activity of the presenting conferee on the presented content; and convert the obtained presented content to content in an application format, wherein the converted content, when presented by an application for viewing the application format, presents a view similar to how the content file is presented on the conferee's computer; and transmit, toward a content receiving endpoint, the content in the application format with the associated information.

10. The system of claim 9, wherein the application format is a portable document format.

11. The system of claim 8, wherein the content transmitting client agent comprises a transmitting application program interface that is configured to obtain the information regarding the activity of the presenting conferee on the presented content from a presentation application.

12. The system of claim 8, wherein the content transmitting client agent is configured to obtain the information regarding the activity of the presenting conferee on the presented content from information that is created by one or more human interfaces devices of the conferee's computer.

13. The system of claim 12, wherein the one or more human interfaces devices comprises a mouse.

14. The system of claim 12, wherein the one or more human interfaces devices comprises a keyboard.

15. The system of claim 1, further comprising an intermediate control unit communicatively coupled between the content transmitting endpoint and the content receiving endpoint, comprising:

an original application content module, wherein the presented content and associated information are transmitted from the content transmitting module toward the content receiving module via the original application content module.

16. The system of claim 15, wherein the original application content module is configured to:

receive the presented content in its original file format and the associated information from the content transmitting client agent; and relay the presented content and associated information toward content receiving module.

17. The system of claim 15, wherein the intermediate control unit is a multipoint control unit.

18. The system of claim 17, wherein the original application content module further comprises:

a content to video converter configured to:
convert received presented content and associated information into a video image of a file view similar to a file view presented by the conferee's computer.

19. The system of claim 18, wherein the video image of the file view is compressed and transmitted toward a second content receiving endpoint as a compressed video stream.

20. The system of claim 15, wherein the content transmitting client agent is further configured to:

obtain presented content of a content file in its original format;

obtain associated information regarding the activity of the presenting conferee on the presented content; and convert the obtained presented content to content in an application format, such that the converted content, when it is presented by the application, presents a view similar to how the content file is presented on the conferee's computer; and transmit toward a third content receiving endpoint the content in the application format with the associated information.

21. The system of claim 20, wherein the application format is a portable document format.

22. A method comprising:

transmitting presented content in its original file format toward a first content receiving endpoint from a content transmitting endpoint;

obtaining associated information regarding activity of a presenting conferee on the presented content;

transmitting the associated toward the first content receiving endpoint; and presenting the presented content and associated information by the first content receiving endpoint similar to how the presented content is presented at the content transmitting endpoint.

23. The method of claim 22, wherein the activity of the presenting conferee comprises marking an area of the content.

24. The method of claim 22, wherein the activity of the presenting conferee comprises pointing at an area of the content.

25. The method of claim 22, wherein the activity of the presenting conferee comprises scrolling the content.

26. The method of claim 22, wherein the original file format is a portable document format.

27. The method of claim 22, wherein the original file format is a spreadsheet file format.

28. The method of claim 22, wherein the associated information is obtained by a transmitting application program interface corresponding to the original file format.

29. The method of claim 22, wherein obtaining associated information comprises:

collecting information that was created by one or more human interfaces devices.

30. The method of claim 29, wherein the one or more human interfaces devices comprises a mouse.

31. The method of claim 29, wherein the one or more human interfaces devices comprises a keyboard.

32. The method of claim 22, further comprising:

converting the original file format to an application file format and the associated information regarding activity of a presenting conferee on the presented content such that the converted content, when it is presented by an application for viewing the application format at the first content receiving endpoint, presents a view similar to how the content file is presented at the content transmitting endpoint.

33. The method of claim 32, wherein the application file format is a portable document format.

* * * * *